(12) United States Patent
Chen

(10) Patent No.: US 9,774,252 B2
(45) Date of Patent: Sep. 26, 2017

(54) MODE CONTROL DEVICE, VOLTAGE CONVERTER, AND MODE CONTROL METHOD

(71) Applicant: SKYWORKS SOLUTIONS, INC., Woburn, MA (US)

(72) Inventor: Ji-Ming Chen, Shanghai (CN)

(73) Assignee: Skyworks Solutions, Inc., Woburn, MA (US)

( * ) Notice: Subject to any disclaimer, the term of this patent is extended or adjusted under 35 U.S.C. 154(b) by 224 days.

(21) Appl. No.: 14/320,512

(22) Filed: Jun. 30, 2014

(65) Prior Publication Data
US 2015/0381045 A1  Dec. 31, 2015

(51) Int. Cl.
*H02M 3/156* (2006.01)
*H02M 1/00* (2006.01)

(52) U.S. Cl.
CPC .... *H02M 3/156* (2013.01); *H02M 2001/0032* (2013.01); *Y02B 70/16* (2013.01)

(58) Field of Classification Search
CPC .... H02M 3/156–3/158; H02M 3/1584; H02M 3/1588; Y02B 70/126; Y02B 70/1466
USPC .................. 323/222, 272, 282–285
See application file for complete search history.

(56) References Cited

U.S. PATENT DOCUMENTS

| | | | |
|---|---|---|---|
| 5,612,610 A * | 3/1997 | Borghi | G05F 1/614 323/222 |
| 5,629,610 A * | 5/1997 | Pedrazzini | H02M 3/156 323/283 |
| 8,786,264 B2 | 7/2014 | Muhammad | |
| 2006/0273772 A1 | 12/2006 | Groom | |
| 2009/0153127 A1* | 6/2009 | Chen | H02M 3/1588 323/350 |
| 2010/0007318 A1 | 1/2010 | Faerber | |

(Continued)

FOREIGN PATENT DOCUMENTS

JP    2014007809 A    1/2014

OTHER PUBLICATIONS

International Search Report and Written Opinion for PCT/US2015/038322 dated Oct. 27, 2015.

(Continued)

*Primary Examiner* — Yemane Mehari
(74) *Attorney, Agent, or Firm* — Chang & Hale LLP

(57) ABSTRACT

Mode control device, voltage converter, and mode control method. In some embodiments, a voltage converter can include a voltage conversion circuit having an inductor configured to be charged and discharged to facilitate conversion of an input voltage to an output voltage, and a switch configured to allow the inductor to be charged and discharged. The voltage converter can further include a logic drive unit configured to provide a drive signal to the switch to control the charging and discharging of the inductor. The voltage converter can further include a mode control unit configured to provide a mode-switching signal to the logic drive unit to control switching from a continuous control mode to a discontinuous control mode based on a first switching threshold, and from the discontinuous control mode to the continuous control mode based on a second switching threshold that is different from the first switching threshold.

20 Claims, 6 Drawing Sheets

(56) References Cited

U.S. PATENT DOCUMENTS

| | | | |
|---|---|---|---|
| 2012/0182003 A1* | 7/2012 | Flaibani | H02M 3/156 323/284 |
| 2014/0217959 A1 | 8/2014 | Chen et al. | |
| 2015/0349630 A1* | 12/2015 | Peng | H02M 3/156 323/282 |

OTHER PUBLICATIONS

Yu et al., "Design of a Tripple-Mode DC-DC Buck Converter", Journal of IKEEE, 2011, vol. 12, No. 2, pp. 134-142 (English Abstract).
Chia, et al., "A High-Efficiency PWM DC-DC Buck Converter with a Novel DCM Control under Light-Load", Circuits and Systems, 2011, IEEE International Symposium, pp. 237-240.

* cited by examiner

MODE CONTROL DEVICE, VOLTAGE CONVERTER, AND MODE CONTROL METHOD

TECHNICAL FIELD

The present application relates to a field of electronic technique, and more particularly, to a mode control device for a voltage converter, a voltage converter, and a mode control method used in the voltage converter.

BACKGROUND

Electronic apparatus typically includes therein electronic modules such as different subsystems and electronic circuits, and so on. These electronic modules usually require different supply voltages for achieving normal operations thereof. For example, an analog power amplifier may require a supply voltage of 3.5 volts, and a digital processing module may require different supply voltages of 1.8 volts, 5 volts, etc. To ensure normal operations of the respective electronic modules in the electronic apparatus, a voltage converter is required to convert a DC voltage (e.g., a voltage from a battery) into another different DC voltage as required by an individual module, that is, a specific input voltage Vin is converted into a different output voltage Vout.

In existing voltage converters, for example, electric energy at an input is stored transitorily in an inductor and/or a capacitor (i.e., a charging process is performed), and thereafter electric energy is released at a different voltage at an output (i.e., a discharging process is performed), so that the input voltage Vin is converted into the desired output voltage Vout. Accordingly, a drive signal is employed to drive a control device (e.g., a switch) in the voltage converter, by which the charging process and the discharging process are controlled so as to obtain the desired output voltage Vout. That is, a turn-on time Ton during which the switch is closed to charge and a turn-off time Toff during which the switch is open to discharge are controlled. The turn-on time Ton corresponds to a pulse width of the drive signal.

In the operation process of the voltage converter, a situation where impedance of a load e.g., an electronic module) driven by its output voltage Vout changes may occur, for example, when an operation state of the electronic module changes, its impedance value relative to the voltage converter will change. In this case, in order to improve conversion efficiency of the voltage converter, it may need to adopt different control methods to control the charging operation and the discharging operation of the voltage converter. For example, when the load driven by the output voltage Vout is a heavy load whose load value is relatively large, a continuous control mode (CCM) may be adopted to control the voltage converter; when the load driven by the output voltage Vout is a light load whose load value is relatively small, a discontinuous control mode (DCM) may be adopted to control the voltage converter. In the continuous control mode, the drive signal drives the control device in the voltage converter to make the voltage converter perform charging and discharging operations continuously. In the discontinuous control mode, the drive signal drives the control device in the voltage converter, so that the voltage converter can halt for some time after performing the charging and discharging operations, and thereafter again perform the charging and discharging operations.

When the load driven by the output voltage Vout changes from the heavy load into the light load, the control mode of the voltage converter needs to be switched from the continuous control mode to the discontinuous control mode. When the load driven by the output voltage Vout changes from the light load into the heavy load, the control mode of the voltage converter needs to be switched from the discontinuous control mode to the continuous control mode. Typically, mode switching is carried out based on load current on the driven load, which will be described below with reference to FIG. 1.

FIG. 1 schematically illustrates a control mode switching in a conventional voltage converter. In FIG. 1, ILoad is load current on a load powered by a voltage converter, IL is inductance current flowing on an inductor for storing and releasing electric energy in the voltage converter; ΔIL is a difference between a peak value and a valley value of the inductance current on the inductor in the voltage converter, i.e., a peak-to-peak value of the inductance current IL. As shown in FIG. 1, when the load current ILoad of the voltage converter is great than ΔIL/2, the voltage converter operates in the continuous control mode; when the load current ILoad is equal to or less than ΔIL/2, the voltage converter operates in the discontinuous control mode. ILoad=ΔIL/2 are switching thresholds for switching from the continuous control mode to the discontinuous control mode, and from the discontinuous control mode to the continuous control mode.

The switching threshold for switching from the continuous control mode to the discontinuous control mode is equal to the switching threshold for switching from the discontinuous control mode to the continuous control mode. When the voltage converter operates in vicinity of the switching threshold, switching between the continuous control mode and the discontinuous control mode may occur frequently due to interference of switching noise of the voltage converter, which increases a ripple of the output voltage of the voltage converter and reduces operation efficiency of the voltage converter. Further, the peak-to-peak value ΔIL of the inductance current depends on the input voltage and output voltage of the voltage converter. After a design of the voltage converter has been determined, the ΔIL has a very small range of change. As a result, the user cannot adjust the voltage converter to adapt to a specific requirement thereof.

SUMMARY

Aspects of the present application may relate to a mode control device for a voltage converter, a voltage converter, an electronic apparatus including the voltage converter, and a control method used in the voltage converter etc.

The mode control device in an embodiment of the present application may be applicable to controlling a voltage converter to switch between a continuous operation mode and a discontinuous operation mode. The voltage converter converts an input voltage to an output voltage Vout, which may be used for powering a load. The voltage converter may comprise: a voltage conversion circuit including a control device and an inductor, the inductor being capable of performing charging and discharging operations, the control device operating under drive of a drive signal to control the charging and discharging operations of the inductor; a logic drive unit for adjusting an operation mode of the voltage conversion circuit, and generating the drive signal for driving the control device, so as to obtain a desired output voltage; and a mode control device for controlling a switching between the continuous control mode and the discontinuous control mode based on inductance current on the inductor, wherein a first switching threshold for switching from the continuous operation mode to the discontinuous operation mode is unequal to a second switching threshold for switching from the discontinuous operation mode to the continuous operation mode, and the second switching threshold lags behind the first switching threshold. The lagging can reduce or even eliminate the switching noise interference during the switching process between the continuous operation mode and the discontinuous operation mode, and reduce a ripple of the output voltage in the discontinuous operation mode.

The mode control device according to an embodiment of the present application may include: an inductance signal detection unit for detecting inductance current flowing on the inductor in the voltage conversion circuit, and outputting at least one of a peak value and a valley value of the detected inductance current IL; a first switching determination unit for determining whether to switch from the continuous control mode to the discontinuous control mode based on a peak-to-peak value of the inductance current and the valley value of the inductance current detected by the inductance signal detection unit, when the voltage converter operates in the continuous control mode; a second switching determination unit for determining whether to switch from the discontinuous control mode to the continuous control mode based on at least one of the peak value or the valley value of the inductance current detected by the inductance signal detection unit, when the voltage converter operates in the discontinuous control mode.

The mode control method in an embodiment of the present application may include: detecting inductance current flowing on the inductor in the voltage conversion circuit, and outputting at least one of a peak value and a valley value of the detected inductance current; when the voltage converter operates in the continuous control mode, determining whether to switch from the continuous control mode to the discontinuous control mode based on a peak-to-peak value of the inductance current and the valley value of the detected inductance current; and when the voltage converter operates in the discontinuous control mode, determining whether to switch from the discontinuous control mode to the continuous control mode based on at least one of the peak value and the valley value of the detected inductance current.

In the technical solutions according to the embodiments of the present application, there is a lagging component between the switching thresholds of the continuous control mode and the discontinuous control mode, and the lagging can reduce impact of the noise on switching of the voltage converter, so as to reduce the ripple of the output voltage when the voltage converter is in a light load state. When the peak value of the inductance current of the voltage converter in the discontinuous control mode is limited, the switching threshold for switching from the discontinuous control mode to the continuous control mode may be lowered by reducing the peak value of the inductance current. In addition, in a case that the load of the voltage converter is very light, reducing the peak value of the inductance current may further reduce the turn-on time of the inductor in the voltage converter, so as to improve operation efficiency of the voltage converter.

BRIEF DESCRIPTION OF THE DRAWINGS

In order to more clearly explain the technical solution, drawings referenced in the description of embodiments or conventional technologies are briefly introduced below. The drawings described below are merely some embodiments of the present invention, and a person of ordinary skill in the art can also obtain other drawings according to these drawings. Identical reference numerals typically indicate identical components throughout these drawings.

FIGS. 5A1, 5A2, 5B1, 5B2 and 5C illustrate a simulation result in which a buck converter switches between a PWM mode and a PFM mode of by using a conventional technique;

FIGS. 6A1, 6A2, 6B1, 6B2 and 6C illustrate a simulation result in which a buck converter switches between a PWM mode and a PFM mode by using a technique according to the present application.

DETAILED DESCRIPTION

The voltage converter to which the present application relates may be a boost converter, a buck converter, or a boost-buck converter etc. The voltage converter converts a supply voltage to voltages required by individual electronic modules in an electronic apparatus. The electronic modules for example are an RF amplifier, a display device, and so on. The electronic apparatus including electronic modules for example is a mobile phone, a tablet computer, a monitor, an e-book reader, a portable digital media player, and so on. Types of the voltage converter, electronics modules to which the power is supplied and the electronic apparatus to which it is applied does not constitute a limitation to the present application.

Figure 2:
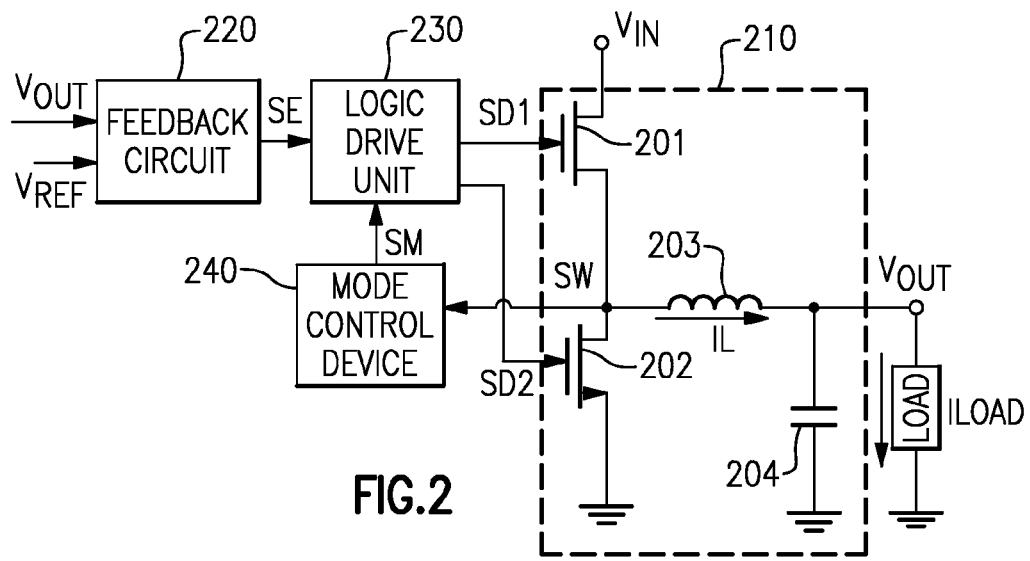
FIG. 2 is a block diagram schematically illustrating a voltage converter including a mode control device according to an embodiment of the present application.

FIG. 2 is a block diagram schematically illustrating a voltage converter including a mode control device according to an embodiment of the present application. The voltage converter 200 shown in FIG. 2 converts an input voltage Vin into an output voltage Vout, which may be used for powering a load.

As shown in FIG. 2, the voltage converter 200 may comprise: a voltage conversion circuit 210 including triodes 201, 202 and an inductor 203, the inductor 203 being located between an output of the triode 201 and a port of the output voltage Vout and for performing charging and discharging operations, the triodes 201 and 202 respectively operating under driving of drive signals Sd1 and Sd2 to control the charging and discharging operations of the inductor 203; a feedback circuit 220 for receiving an output feedback (e.g., output voltage Vout) of the voltage converter 200, comparing it with a reference voltage Vref that corresponds to a target voltage to be output, and outputting an error control signal Se; a logic drive unit 230 for adjusting an operation mode for the voltage conversion circuit 210, generating drive signals Sd1 and Sd2 for driving the triodes 201 and 202 according to the error control signal Se output by the feedback circuit 220, so as to obtain the desired output voltage Vout; and a mode control device 240 for generating a mode switching signal Sm that controls switching between a continuous control mode to a discontinuous control mode.

As shown in FIG. 2, in addition to the triode 201, the triode 202 and the inductor 203, the voltage conversion circuit 210 may further comprise a capacitor 204, which is connected between the port of the output voltage Vout and the ground, and used for ensuring stable output of the output voltage Vout.

During the charging process, the triode 202 turns off, the diode 201 turns on, the inductor 203 is charged and the inductance current is generated. Since the input voltage Vin is direct current (DC), the inductance current on the inductor 203 increases linearly with a certain rate, in order to charge the output capacitor 204 to maintain the output voltage, and correspondingly provide a desired current to the load. During the discharging process, the triode 201 turns off, the triode 202 turns on. Because of a holding characteristic of the inductance current, the current that passes through the inductor 203 will slowly decrease from a value when the charging is completed, until a next charging process starts or the current value drops to zero. Accordingly, the inductor L starts to charge the capacitor C, thereby the output voltage Vout is maintained. The triode 201 and the triode 202 in FIG. 2 are control devices for controlling the charging and discharging operations of the voltage converter.

The voltage converter 210 in FIG. 2 is a buck conversion circuit. In a case where the voltage converter is a boost converter, the voltage conversion circuit 210 is a boost conversion circuit. In a case where the voltage converter is a boost-buck converter, the voltage conversion circuit 210 is a boost-buck conversion circuit. The specific structure of the voltage conversion circuit 210 does not constitute a limitation to the present application.

The feedback circuit 220 forms a feedback loop of the voltage converter 200, which, for example, may be implemented by an error amplifier. The error amplifier may compares the output voltage Vout with the reference voltage Vref, and generates the error control signal Se, so as to control the charging and discharging operations, so that the output voltage Vout is close to a desired target voltage. Furthermore, the feedback circuit 220 may further include a voltage divider for dividing the output voltage Vout, and use the error amplifier to compare a portion of the output voltage Vout with the corresponding reference voltage.

The logic drive unit 230 may control the operation mode of the voltage conversion circuit 210 according to the mode switching signal Sm output from the mode control device 240. The operation mode may, for example, include a continuous control mode, a discontinuous control mode etc. The continuous control mode may for example be a pulse width modulation (PWM), and the discontinuous control mode may for example be a pulse frequency modulation (PFM) and a burst mode etc.

In the PWM mode, the voltage converter has a fixed on-off frequency fsw, which is equal to a reciprocal of a work period Tsw of the control device of the voltage converter, i.e., fsw=1/Tsw=1/(Ton+Toff), wherein Ton is a turn-on time during which the triode 201 turns on and the triode 202 turns off to charge in FIG. 2, and Toff is a turn-off time during which the triode 201 turns off and the triode 202 turns on to discharge. During the operation process of the voltage converter, the charging and discharging operations are changed by changing the turn-on time Ton and the turn-off time Toff. However, the turn-on time Ton cannot be infinitely small, so that a decrease of a duty ratio in a light load state is limited. Correspondingly, the pulse width modulation mode is usually applied to a case in which the load driven by the voltage converter is a heavy load. In the PFM mode, the on-off frequency fsw of the voltage converter may vary, the voltage converter may be in a discontinuous control mode in which it operates discontinuously, and thereby being applicable to a case where the load driven by the voltage converter is the light load. In the burst mode, the voltage converter may suddenly operate for one or more periods as required, then suspend, and so forth.

As for whether the load of the voltage converter is the heavy load or the light load, it may be determined by setting a load threshold based on input voltage, a driving capability of the voltage converter etc. If the load of the voltage converter is greater than or equal to the load threshold, then it is the heavy load, if the load of the voltage converter is equal to or less than the load threshold, then it is the light load. As an example, when the input voltage of the voltage converter is relatively high, the load threshold becomes larger; when the input voltage of the voltage converter is relatively small, the load threshold becomes smaller.

The logic drive unit 230 also receives the error control signal Se from the feedback circuit 220, and generates drive signals Sd1 and Sd2 for driving the triode 201 and the triode 202 based on the mode switching signal Sm and the error control signal Se, so as to obtain the desired output voltage Vout. As for the logic drive unit including the respective operation modes, it may be implemented by the existing techniques or a variety of techniques that may appear in the future, its specific implementations do not constitute a limitation to the embodiments of present application.

Hereinafter, for convenience of the description, it is assumed that the voltage converter switches from the pulse width modulation to the pulse frequency modulation when the load of the voltage converter changes from the heavy load to the light load. This is merely an example, and embodiments of the present application can also be applied to switching from other continuous control modes to other discontinuous control modes.

In the conventional mode control technique, as described in connection with FIG. 1, a switching threshold for switching from the continuous control mode to the discontinuous control mode is equal to a switching threshold for switching from the discontinuous control mode to the continuous control mode. When the voltage converter operates in a vicinity of the switching threshold, switching between the continuous control mode and the discontinuous control mode may occur frequently, which increases a ripple of output voltage of the voltage converter and reduces operation efficiency of the voltage converter. Therefore, it is expected that there is lagging in the switching threshold upon switching from the discontinuous control mode to the continuous control mode. For example, the switching threshold for switching from the discontinuous control mode to the continuous control mode is expected to be greater than the switching threshold for switching from the continuous control mode to the discontinuous control mode, in order to avoid frequent occurrence of mode switching. In addition, it is further expected that the threshold values of mode switching can be adjusted, so that the user can adjust the voltage converter to adapt to the specific requirement thereof.

The mode control device 240 according to the embodiment of the present application can control the switching between the continuous operation mode and the discontinuous operation mode based on the inductance current on the inductor 203, wherein a first switching threshold for switching from the continuous operation mode to the discontinuous operation mode is unequal to a second switching threshold for switching from the discontinuous operation mode to the continuous operation mode, and a lagging component exists in at least one of the first switching threshold and the second switching threshold.

The lagging component can reduce or even eliminate a switching noise interference during the switching process between the continuous operation mode and the discontinuous operation mode, especially upon switching from the discontinuous operation mode to the continuous operation mode.

The above voltage converter to which the mode control device of the embodiment of the present application is applied described in conjunction with FIG. 2 is merely illustrative, which may further include other portions, for example, a frequency oscillator, a low current control circuit for controlling low current under the pulse frequency modulation mode, and so on.

Figure 3:
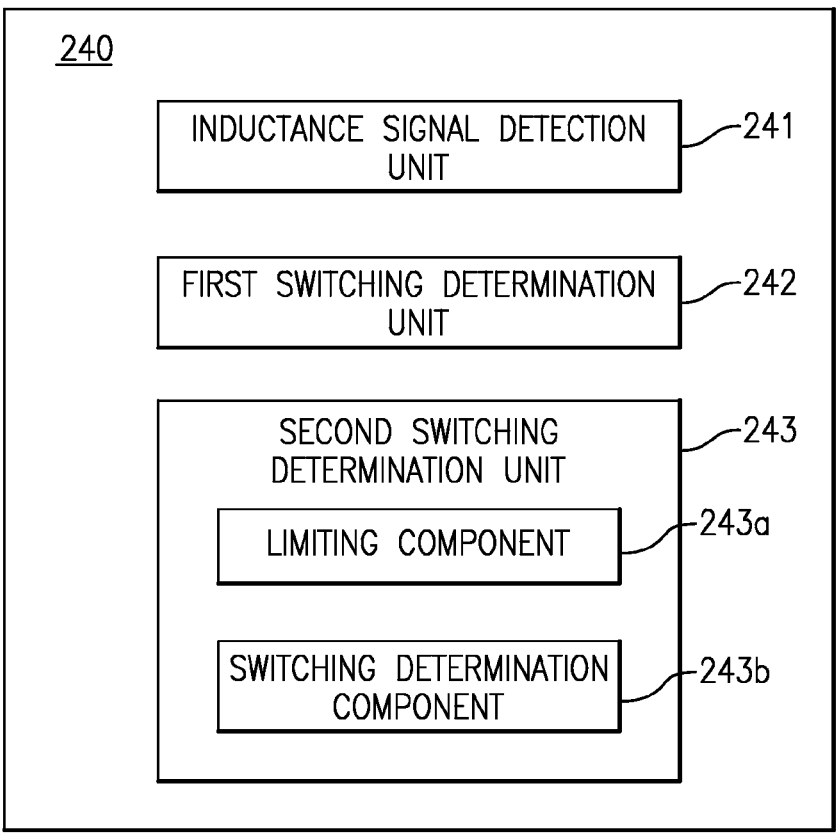
FIG. 3 is a block diagram schematically illustrating a mode control device according to an embodiment of the present application.

FIG. 3 is a block diagram schematically illustrating a mode control device according to an embodiment of the present application. The mode control device may be applied to the voltage converter described above in conjunction with FIG. 2, which includes, but is not limited to, a boost converter, a buck converter, a boost-buck converter etc. In addition, the mode control device may be further applied to a voltage converter which converts alternating current to direct current.

As shown in FIG. 3, the mode control device 240 may include: an inductance signal detection unit 241 for detecting inductance current flowing on the inductor in the voltage conversion circuit, and outputting a peak value IL_peak and a valley value IL_valley of the detected inductance current; a first switching determination unit 242 for determining whether to switch from the continuous control mode to the discontinuous control mode based on a peak-to-peak value ΔIL of the inductance current and the valley value IL_valley of the inductance current detected by the inductance signal detection unit 241, when the voltage converter operates in the continuous control mode; a second switching determination unit 243 for determining whether to switch from the discontinuous control mode to the continuous control mode based on the peak value IL_peak or the valley value IL_valley of the inductance current IL detected by the inductance signal detection unit 241, when the voltage converter operates in the discontinuous control mode. Hereinafter, a case where the continuous operation mode is a PWM mode and the discontinuous operation mode is a PFM mode is taken as an example to describe the operation of the mode control device 240.

The inductance signal detection unit 241 detects current flowing on the inductor (e.g., the inductor 203 in FIG. 2) in the voltage conversion circuit. For example, the inductance signal detection unit 241 may detect the current in the point SW in the voltage conversion circuit in FIG. 2. The peak value and the valley value the inductance signal on the inductor may be determined based on the inductance current, and switching of the control mode is determined by the peak value or the valley value.

The inductance signal detection unit 241 may detect the inductance current flowing on the inductor by employing various techniques. For example, the inductance signal detection unit 241 may use a resistor with an extremely small resistance to separate a small part of current signals from the inductor; or it may also use a linear resistance area of a power tube (e.g., MOSFET) to detect the inductance current, and correspondingly, the inductance signal may be detected by detecting a voltage between a source and a drain of the power tube when it operates in the linear resistance area. The techniques for detecting the inductance signal as adopted by the inductance signal detection unit 241 do not constitute a limitation to the embodiments of present application. Alternatively, the inductance signal detection unit 241 may further detect a voltage at the point SW in the voltage conversion circuit in FIG. 2, so as to obtain the inductance voltage, and output a peak value or valley value of the detected inductance voltage.

Figure 4:
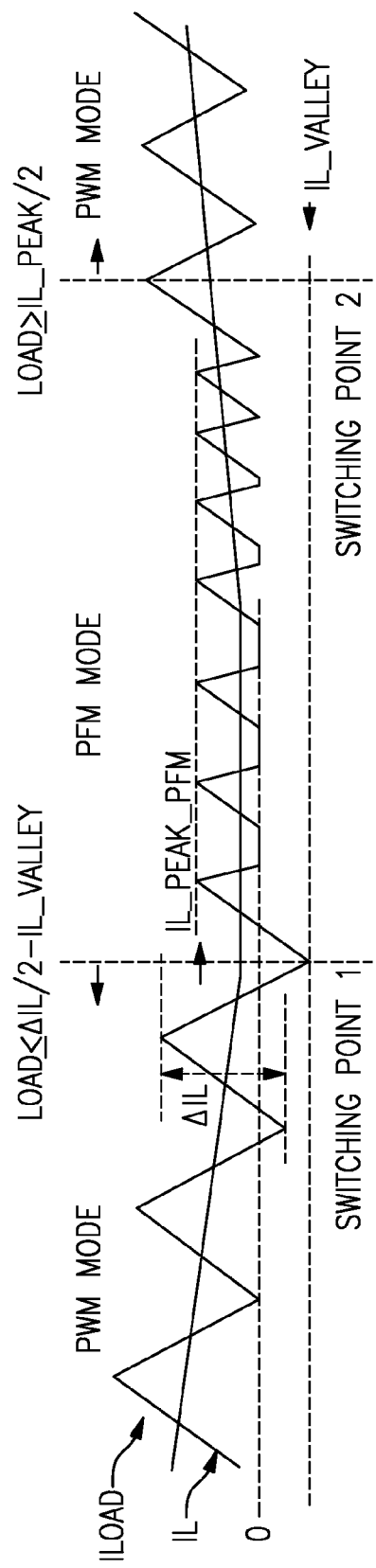
FIG. 4 schematically illustrates a control mode switching performed by a voltage converter under the control of the mode control device according to an embodiment of the present application.

The detecting operation performed by the inductance signal detection unit 241 is described in conjunction with FIG. 4. FIG. 4 schematically illustrates a control mode switching performed by a voltage converter under a control of the mode control device 240 according to an embodiment of the present application. In FIG. 4, ILoad is a load current on a load powered by a voltage converter, for example, the current in the output port Vout in FIG. 2; IL is a inductance current flowing on the inductor 203 in FIG. 2; ΔIL is a difference between a peak value and a valley value of the inductance current, i.e., a peak-to-peak value.

As shown in FIG. 4, during the charging process of the inductor, the triode 202 turns off and the triode 201 turns on in FIG. 2, the inductance current increases. When the inductance current increases to the peak value, the charging process ends and the discharging process starts. During the discharging process of the inductor, the triode 201 turns off and the triode 202 turns on in FIG. 2, the inductance current begins to decrease from the peak value, when the inductance current decreases to the valley value in a PWM mode, the discharging comes to an end. When the inductance current decreases to 0 in a PFM mode, the discharging comes to an end. After the discharging process ends, a next charging process starts immediately in the PWM mode, and the charging process suspends or a next charging process starts in the PFM mode.

As an example, when it is necessary to detect the peak value of the inductance current, the inductance current during the charging process of the inductor may be detected. Accordingly, when the triode 201 turns on and the triode 202 turns off to charge the inductor, the current on the triode 201 is equal to that on the inductor 203, the inductance signal detection unit 241 may detect voltage Vsw at the point SW in FIG. 2, and obtain the inductance current by the following equation:

$$IL = (Vin - Vsw)/R1 \quad \text{Equation (1)},$$

where Vin is an input voltage of the voltage converter, Vsw is a voltage at the connection point SW between the triode 201 and the inductor, R1 is resistance of the triode 201 in a turned-on state. The inductance signal detection unit 241 can obtain the peak value IL_peak of the inductance current by the inductance current IL.

As an example, when it is necessary to detect the valley value of the inductance current, a valley value reached during the discharging process of the inductor may be detected. Accordingly, when the triode 201 turns off and the triode 202 turns on to discharge the inductor, the current flowing in the triode 202 is equal to the inductance current on the inductor 203. Here a case where the inductance current drops below zero in a PWM mode is taken as an example for illustration below. When the charging just ends and the discharging process starts, because of a holding characteristic of the current of the inductor, the inductance current flows along a direction from the triode 202 to the inductor 203 and gradually decreases, a voltage Vsw at the point SW is negative. When the inductance current decreases to zero, changes to a direction from the inductor 203 to the triode 202 and gradually increases, the voltage Vsw is positive. When the discharging process is completed, the current on the inductor reaches the valley value IL_valley. Therefore, during the process when the triode 201 turns off and the triode 202 turns on to discharge the inductor, the inductance signal detection unit 241 may detect the voltage Vsw of point SW in FIG. 2, and obtain the inductance current by the following Equation (2):

$$IL = Vsw/R2 \quad \text{Equation (2)}$$

where Vsw is the voltage on the connection point SW between the triode 201 and the inductor, R2 is resistance of the triode 202 in a turned-on state. The inductance signal detection unit 241 can obtain the valley value IL_valley of the inductance current by the inductance current IL. That is to say, the inductance signal detection unit 241 may obtain the valley value IL_valley of the inductance current by detecting the maximum positive voltage of the triode 202.

The above merely schematically illustrate a mode of the inductance signal detection unit 241 to detect the peak value IL_peak and the valley value IL_valley of the inductance current. Alternatively, the inductance signal detection unit 241 may further detect a current at the connection point between the inductor 203 and the load to obtain the peak value IL_peak and the valley value IL_valley.

In the mode control device 240, determination results of the first switching determination unit 242 and the second switching determination unit 243 can be recorded, and whether the voltage converter operates in the continuous control mode or the discontinuous control mode is determined according to the determination results.

When the voltage converter operates in the continuous control mode, the first switching determination unit 242 can determine whether to switch from the continuous control mode to the discontinuous control mode based on the peak-to-peak value ΔIL of the inductance current and the valley value IL_valley of the inductance current detected by the inductance signal detection unit 241, wherein the valley value IL_valley is negative, as shown by the following Equation (3):

$$ILoad \leq \Delta IL/2 - |IL\_valley| \quad \text{Equation (3)}$$

where ILoad is load current on the load powered by the voltage converter, ΔIL is the peak-to-peak value of the inductance current flowing on the inductor in the voltage converter, |IL_valley| is an absolute value of the valley value IL_valley of the inductance current. When the load current ILoad is less than or equal to a half of the peak-to-peak value ΔIL minus the absolute value of the valley value IL_valley, the continuous control mode is switched to the discontinuous control mode, when the load current ILoad is greater than the half of the peak-to-peak value ΔIL minus the absolute value of the valley value IL_valley, the current continuous control mode is maintained.

When the voltage converter operates in the PWM mode, the peak-to-peak value ΔIL of the inductance current can be expressed as the following Equation (4):

$$\Delta IL = \frac{Tsw * (Vin - Vout) * Vout}{L * Vin}, \quad \text{Equation (4)}$$

where Tsw is a work period of the voltage converter and is equal to a sum of the turn-on time Ton and the turn-off time Toff, the Vin is an input voltage of the voltage converter, Vout is an output voltage of the voltage converter, the L is an inductance value of the inductor (203 in FIG. 2) in the voltage converter. After the voltage converter is well designed, all the parameters on the right side of Equation (4) are basically constant, the peak-to-peak value ΔIL of the inductance current is also basically constant, which can be pre-calculated. Accordingly, the first switching determination unit 242 can obtain the load current ILoad, receive the valley value IL_valley of the inductance current from the inductance signal detection unit 241, and determine whether to switch from the continuous control mode to the discontinuous control mode based on Equation (3). The load current ILoad may be obtained by existing techniques or a variety of techniques that may appear in the future, and the specific obtaining technical does not constitute a limitation to the embodiments of the present application. For example, the load current ILoad may either be fed by a load module driven by the voltage converter, or be obtained by detecting a current at the point Vout shown in FIG. 2.

As shown in FIG. 4, when the voltage converter operates in the PWM mode, the load powered by the voltage converter gradually decreases, and the load current ILoad also gradually decreases. When the load current ILoad is greater than a half of the peak-to-peak value ΔIL minus the absolute value of the valley value IL_valley, the voltage converter is maintained in the PWM mode to perform the charging and discharging operations. When the load current ILoad is less than or equal to a difference between the half of the peak-to-peak value ΔIL and the absolute value of the valley value IL_valley (the switching point 1 in FIG. 4), the voltage converter switches from the PWM mode to the PFM mode.

Compared with switching from the PWM mode to the PFM mode when the load current ILoad decreases to be less than or equal to ΔIL/2 in the prior art, the present invention can switch from the PWM mode to the PFM mode when the load current ILoad decreases to be ΔIL/2−|IL_valley|. The absolute value of the valley value of the inductance current is a lagging component added relative to the prior art, which can reduce impact of noise on switching of the voltage converter, so as to avoid frequent mode switching in the voltage converter.

Alternatively, the first switching determination unit 242 may not obtain the load current ILoad, but merely determine whether to switch from the continuous control mode to the discontinuous control mode based on the valley value IL_valley of the inductance current detected by the inductance signal detection unit 241. In the voltage converter, when the load current decreases, the valley value of the inductance current also decreases; when the load current increases, the valley value of the inductance current also increases. A corresponding relationship between the two is shown as the following monotonic function F1:

$$ILoad = F1(IL\_valley) \quad \text{Equation (5)}$$

It can be known by substituting Equation (5) into the above Equation (3) that, whether to switch from the continuous control mode to the discontinuous control mode can be determined merely based on the valley value IL_valley of the inductance current. Therefore, a valley threshold may be preset based on the function correspondence in Equation (5) and the peak-to-peak value ΔIL. When the valley value IL_valley of the inductance current detected by the inductance signal detection unit 241 is less than or equal to the valley threshold, the continuous control mode is switched to the discontinuous control mode. When the valley value IL_valley of the inductance current detected by the inductance signal detection unit 241 is greater than the valley threshold, the current continuous control mode is maintained.

When a user of the voltage converter expects to set different minimum ILoad min of load current according to different applications, that is, the minimum ILoad min of the load current is predetermined for a specific application, Equation (6) may be obtained according to Equation (3):

$$|IL\_valley| \leq \Delta IL/2 - ILoad\_min \qquad \text{Equation (6).}$$

Since the peak-to-peak value ΔIL of the inductance current can be obtained according to the above Equation (4), the minimum value ILoad min of the load current is predetermined, thus the following can be derived according to Equation (6): when the valley value IL_valley detected when the inductance current is less than zero satisfies Equation (6), the current continuous control mode is switched to the discontinuous control mode; when the valley value IL_valley detected when the inductance current is less than zero does not satisfy Equation (6), the current continuous control mode is maintained. In addition, if the minimum value ILoad min of the load current is set with respect to different applications, the valley threshold of the inductance current can be easily obtained according to Equation (6), so as to facilitate flexible control the switching from the continuous control mode to the discontinuous control mode with respect to different applications by setting the valley threshold.

When the voltage converter operates in the discontinuous control mode, the second switching determination unit 243 determines whether to switch from the discontinuous control mode to the continuous control mode based on the peak value IL_peak or the valley value IL_valley of the detected inductance current IL. As an example, the second switching determination unit 243 can obtain the load current, and determine whether to switch from the discontinuous control mode to the continuous control mode based on the following Equation (7):

$$ILoad > a \cdot IL\_peak \qquad \text{Equation (7),}$$

where ILoad is load current on the load powered by the voltage converter, a is a constant greater than or equal to ½ and less than 1. The value of a is typically ½, ⅔, etc. When the obtained load current ILoad satisfies Equation (7), the second switching determination unit 243 determines to switch from the discontinuous control mode to the continuous control mode. When the obtained load current ILoad does not satisfy Equation (7), the second switching determination unit 243 determines to maintain the current discontinuous control mode. The load current can be obtained by the existing techniques or a variety of techniques that may appear in the future, and the way for obtaining the load current does not constitute a limitation to the embodiments of the present application.

When the load current decreases, the peak value of the inductance current also decreases; when the load current increases, the peak value of the inductance current also increases. When the load of the voltage converter increases so that it is necessary to increase the load current, if the load current increases to satisfy Equation (7), then the electric energy conversion capability represented by the inductance current in the discontinuous control mode can no longer meet the requirement of load. It is necessary to quit the discontinuous control mode, and switch to the continuous control mode, so as to provide stronger electric energy conversion capability to meet the requirement of the load current.

The second switching determination unit 243 can make the inductance current detected by the inductance signal detection unit 241 less than or equal to a peak threshold IL_peak_th and greater than or equal to a valley threshold IL_valley_th, and determine whether to switch from the discontinuous control mode to the continuous control mode based on the peak value IL_peak and the valley value IL_valley of the inductance current, which will be described typically in conjunction with a case that the discontinuous control mode is the PFM mode.

As an example, in the case that the discontinuous control mode is the PFM mode, the second switching determination unit 243 may include: a limiting component 243a for limiting the inductance current of the inductor to be less than or equal to the peak threshold IL_peak_th and greater than or equal to the valley threshold IL_valley_th based on the inductance current detected by the inductance signal detection unit 241; a switching determination component 243b for determining whether to switch from the discontinuous control mode to the continuous control mode based on the peak value IL_peak or the valley value IL_valley of the detected inductance current.

Typically, in the charging process of the voltage converter, the triode 202 turns off, the triode 201 turns on, the limiting component 243a compares the inductance current detected by the inductance signal detection unit 241 with the peak threshold IL_peak_th. When the detected inductance current increases to be equal to the peak threshold IL_peak_th, the triode 202 is turned off and the triode 202 is turned on and to discharge, so as to limit the inductance current to be less than the peak threshold IL_peak_th. In the discharging process of the voltage converter, the triode 201 turns off, the triode 202 turns on, and the limiting component 243a compares the inductance current detected by the inductance signal detection unit 241 with the valley threshold IL_valley_th. When the detected inductance current decreases to be equal to the peak threshold IL_peak_th, it makes the triodes 201 and 202 turned off so as to stop the charging and discharging operations, until a next charging operation starts, so that the inductance current is limited to be greater than the valley threshold IL_valley_th.

As an example, the limiting component 243a may determine the peak threshold IL_peak_th of the inductance current in the PFM mode according to the following Equation (8):

$$IL\_peak\_th = ILoad\_min/a \qquad \text{Equation (8),}$$

where ILoad_min is the minimum load current on the load powered by the voltage converter, a is a constant greater than or equal to ½ and less than 1. The minimum load current ILoad_min is a preset value, which may be different in different applications. The constant a is typically ½, ⅔, etc. The valley threshold IL_valley_th may be a preset value and less than the peak threshold IL_peak_th, which may be equal to 0, or be greater than 0 or less than 0.

When the voltage converter operates in the discontinuous control mode, the switching determination component 243b may obtain the load current, and compares the obtained load current with the peak threshold IL_peak_th, and determine whether to switch from the PFM mode to the PWM mode according to the above Equation (7). Alternatively, the switching determination component 243b may determine whether to switch from the PFM mode to the PWM mode based on the valley value IL_valley of the inductance current detected by the inductance signal detection unit 241. When the valley value IL_valley of the inductance current detected by the inductance signal detection unit 241 is equal to the valley threshold IL_valley_th, the switching determination component 243b determines to maintain the current PFM mode. When the valley value IL_valley of the inductance current detected by the inductance signal detection unit 241 is greater than the valley threshold IL_valley_th, the switching determination component 243b determines to switch from the PFM mode to the PWM mode.

Switching from the PFM mode to the PWM mode is described below in conjunction with FIG. 4. When the voltage converter operates in the PFM mode, the inductance current is between the peak threshold IL_peak_th and the valley threshold IL_valley_th (0 in FIG. 4), and the voltage converter is in a light load since the load current ILoad is relatively low. It should be noted that a user can change the peak threshold IL_peak_th and the valley threshold IL_valley_th in the PFM mode as required, to adapt to different applications.

According to FIG. 4, it can be seen that in the PFM mode, when the load of the voltage converter is relatively low, the inductance current on the inductor is maintained as zero in a certain time period, i.e., the voltage converter is stopped. As the load current increases, the time period with the inductance current being zero is gradually shortened until it disappears. When the time period with the inductance current being zero disappears, the valley value IL_valley of the inductance current detected by the inductance signal detection unit 241 is greater than the valley threshold IL_valley_th, the switching determination component 243b determines to switch from the PFM mode to the PWM mode.

When the voltage converter is limited to the peak value of the inductance current in the PFM mode as shown in FIG. 4, the switching point from the PFM mode to the PWM mode may be lowered by reducing the peak threshold of the inductance current. In addition, in a case where the load of the voltage converter is very light, reducing the peak threshold of the inductance current may further reduce the turn-on time of the inductor in the voltage converter, in order to improve operation efficiency of the voltage converter.

In the conventional art, the switching threshold (ILoad=ΔIL/2) for switching from the continuous control mode to the discontinuous control mode is equal to the switching threshold for switching from the discontinuous control mode to the continuous control mode. When the voltage converter operates in the vicinity of the switching point, switching between the continuous control mode and the discontinuous control mode may occur frequently, which increases output voltage ripple of the voltage converter and reduces operation efficiency of the voltage converter. In the embodiment of the present application, the discontinuous control mode is switched to the continuous control mode when the load current is greater than or equal to a·IL_peak; and the continuous control mode is switched to the discontinuous control mode when the load current is less than or equal to ΔIL/2−|IL_valley|. Therefore, there is a lagging component a·IL_peak−(ΔIL/2−|IL_valley|) between switching thresholds of the two modes, and the lagging can reduce impact of noise on switching of the voltage converter, so as to reduce the ripple of output voltage when the voltage converter is in a light load state.

It should be noted that, when mode control is performed in the voltage converter, in addition to where the mode control device 240 includes both the first switching determination unit 242 and second switching determination unit 243 as described above, the mode control device 240 may also include only one of the first switching determination unit 242 and second switching determination unit 243. That is, the mode control device 240 may only include the inductance signal detection unit 241 and the first switching determination unit 242, so as to control the voltage converter to switch from the continuous control mode to the discontinuous control mode. Or, the mode control device 240 may only include the inductance signal detection unit 241 and the second switching determination unit 243, so as to control the voltage converter to switch from the discontinuous control mode to the continuous control mode.

FIGS. 5A1, 5A2, 5B1, 5B2 and 5C illustrate a simulation result in which a buck converter switches between the PWM mode and the PFM mode by using a conventional technique. The simulation result is performed based on the following conditions: the input voltage Vin of the buck converter is 3.3V, the output voltage Vout of the buck converter is 1.8V, and the inductance value of the inductor in the buck converter is 1.5 µH (micro henry).

Figure 1:
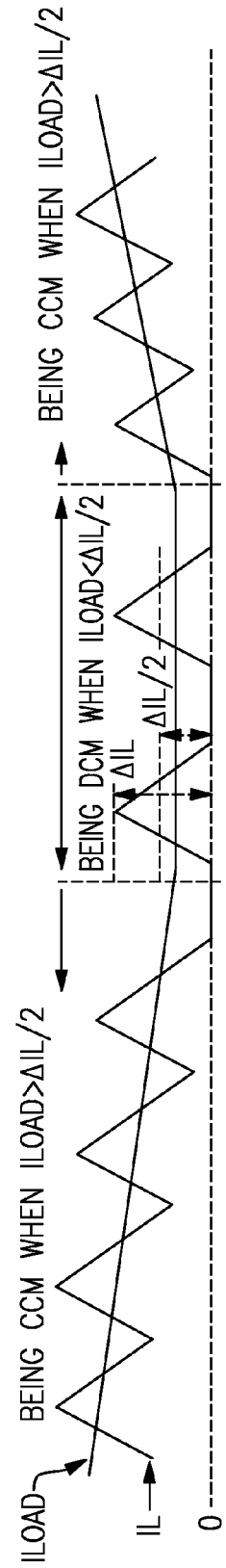
FIG. 1 schematically illustrates a control mode switching in a conventional voltage converter.

FIGS. 5A1 and 5A2 show load current and inductance current when the buck converter switches from the PWM mode to the PFM mode by using a conventional technique. A horizontal axis is time in unit of millisecond (ms). FIG. 5A1 shows the load current ILoad in unit of milliamp (mA), and FIG. 5A2 shows inductance current IL in unit of milliamp (mA). As shown in FIGS. 5A1 and 5A2, the buck converter in the PWM mode switches from the PWM mode to the PFM mode when the load current is 190.3 mA.

FIGS. 5B1 and 5B2 show load current and inductance current when the buck converter switches from the PFM mode to the PWM mode by using the conventional technique. A horizontal axis is time in unit of millisecond (ms). FIG. 5B1 shows the load current ILoad in unit of milliamp (mA), and FIG. 5B2 shows the inductance current IL in unit of milliamp (mA). As shown in FIGS. 5B1 and 5B2, the buck converter in the PFM mode switches from the PWM mode to the PFM mode when the load current is 197.2 mA.

Figure 5C:
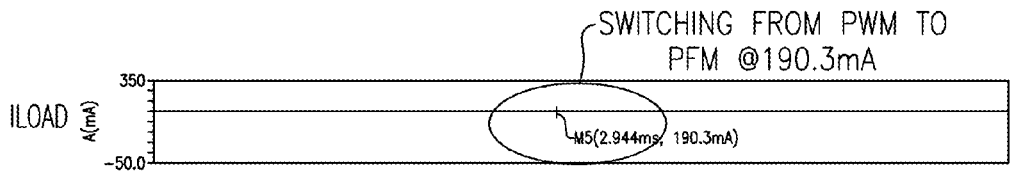
Figure 5C:
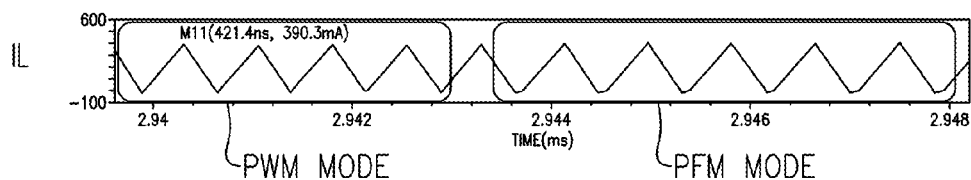
Figure 5C:
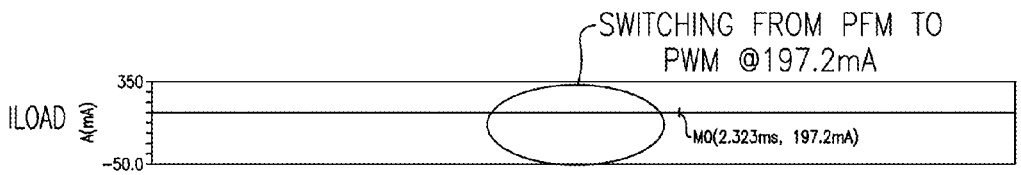
Figure 5C:
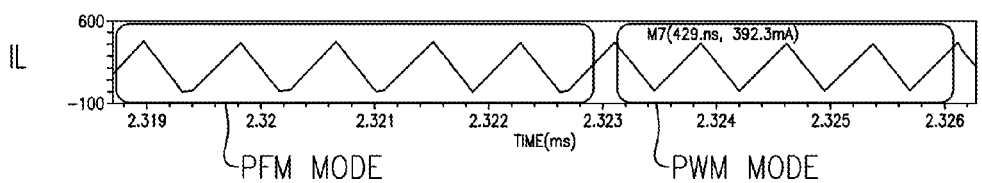
Figure 5C:
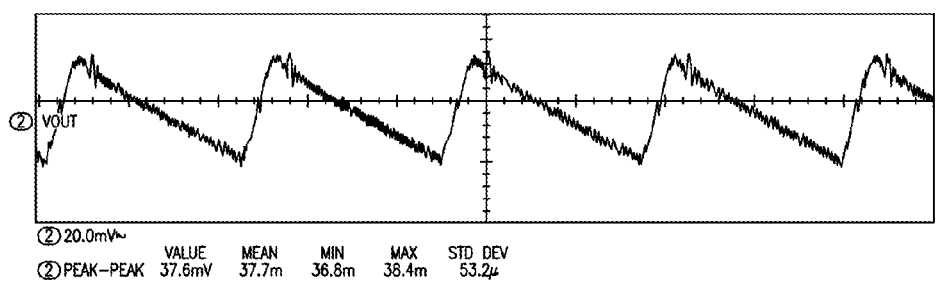

FIG. 5C shows an output voltage of the buck converter using the conventional technique. A horizontal axis is time in unit of microsecond (µs). A vertical axis shows an output voltage Vout in unit of millivolt (mV). As shown in FIG. 5C, the peak-to-peak value of the output voltage Vout is 37.6 mV.

According to FIGS. 5A1, 5A2, 5B1, 5B2 and 5C, it can be seen that, the load current 190.3 mA at which the PWM mode is switched to the PFM mode is very close to the load current 197.2 mA at which the PFM mode is switched to the PWM mode, a very small lagging exists between the former and the latter, and the ripple of the output voltage of the buck converter is relatively large (the peak-to-peak value is 37.6 mV).

FIGS. 6A1, 6A2, 6B1, 6B2 and 6C illustrate a simulation result in which a buck converter switches between a PWM mode and a PFM mode by using a technique according to the present application. The conditions on which the simulation result of FIG. 6 is based is the same as that of FIG. 5, namely, the input voltage Vin of the buck converter is 3.3V, the output voltage Vout of the buck converter is 1.8V, and the inductance value of the inductor in the buck converter is 1.5 µH (microhenry). In the PFM mode, the inductance current will further be limited to be less than or equal to the peak threshold and greater than or equal to the valley threshold.

FIGS. 6A1 and 6A2 show load current and inductance current of the buck converter upon switching from the PWM mode to the PFM mode. The buck converter performs switching from the PWM mode to the PFM mode according to the above-described Equation (3). A horizontal axis is time in unit of millisecond (ms). FIG. 6A1 shows load current ILoad in unit of milliamp (mA), and FIG. 6A2 shows inductance current IL in unit of milliamp (mA). As shown in FIGS. 6A1 and 6A2, the buck converter in the PWM mode switches from the PWM mode to the PFM mode when the load current is 43.05 mA.

FIGS. 6B1 and 6B2 show load current and inductance current of the buck converter upon switching from the PFM mode to the PWM mode. The buck converter performs switching from the PFM mode to the PWM mode according to the above-described Equation (7), wherein the constant a is equal to ½. A horizontal axis is time in unit of millisecond (ms). FIG. 6B1 shows the load current ILoad in unit of milliamp (mA), and FIG. 6B2 shows the inductance current IL in unit of milliamp (mA). As shown in FIGS. 6B1 and 6B2, the buck converter in the PFM mode switches from the PFM mode to the PWM mode when the load current is 71.55 mA.

Figure 6C:
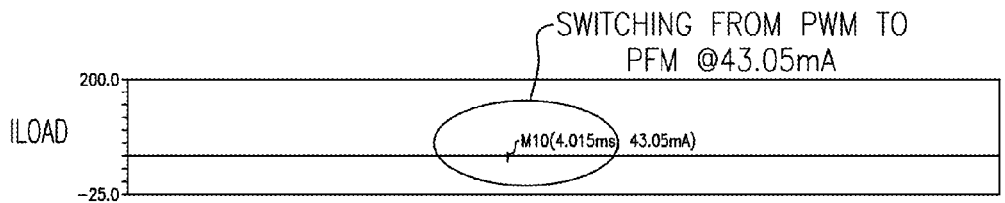
Figure 6C:
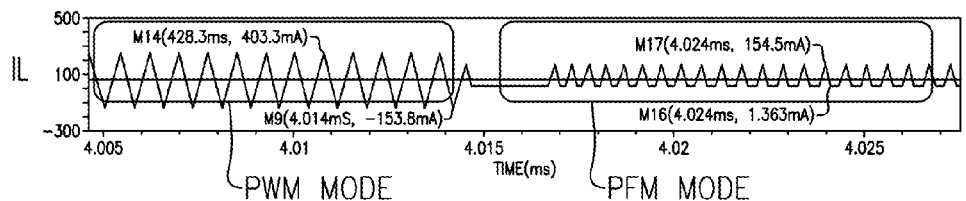
Figure 6C:
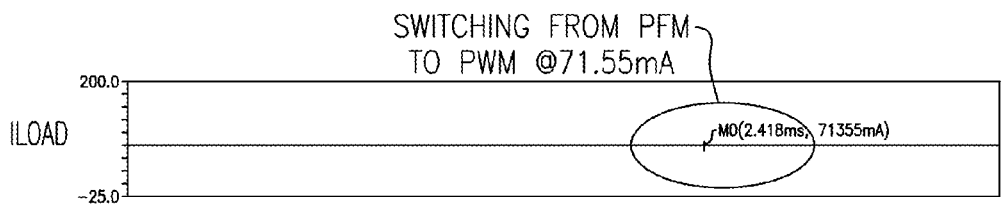
Figure 6C:
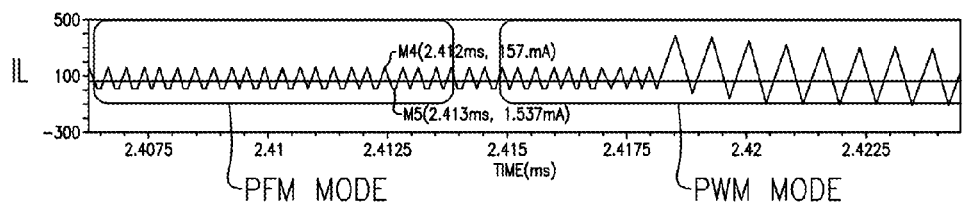
Figure 6C:
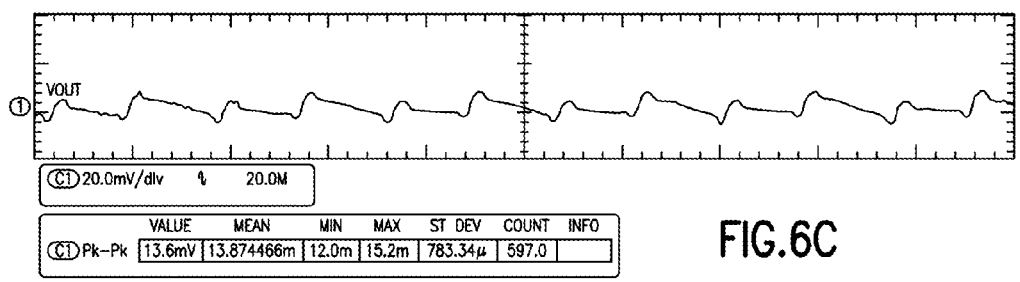

FIG. 6C shows an output voltage of the buck converter by using techniques of the present application. A horizontal axis is time in unit of microsecond (μs). A vertical axis shows an output voltage Vout in unit of millivolt (mV). As shown in FIG. 6C, the peak-to-peak value of the output voltage Vout is 13.6 mV, which is far less than 37.6 mV in FIG. 5C.

According to FIGS. 6A1, 6A2, 6B1, 6B2 and 6C, it can be seen that, the load current 43.05 mA at which the PWM mode is switched to the PFM mode is much smaller than the load current 71.55 mA at which the PFM mode is switched to the PWM mode, a lagging of 28.5 mA exists between the former and the latter, and the ripple of the output voltage of the buck converter is relatively small, the peak-to-peak value being 13.6 mV. In addition, the buck converter by using the techniques of the present application can further perform mode switching under a relative small load current, which can improve operation efficiency of the buck converter in the light load state.

Figure 7:
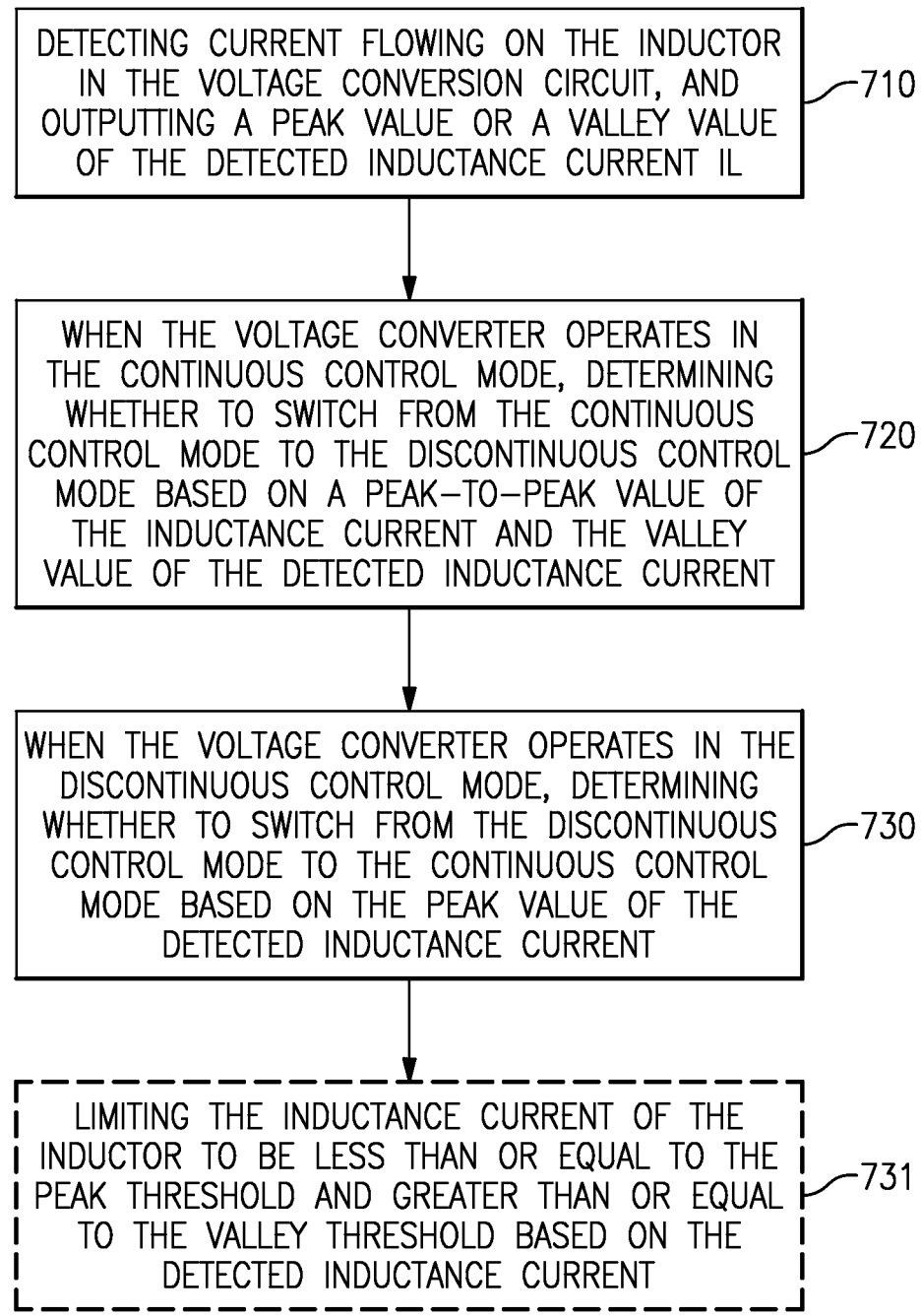
FIG. 7 is a flowchart schematically illustrating a mode control method according to an embodiment of the present application.

FIG. 7 is a flowchart schematically illustrating a mode control method 700 according to an embodiment of the present application. The mode control method 700 is applicable for controlling a voltage converter to switch between a continuous operation mode and a discontinuous operation mode. The voltage converter converts an input voltage to an output voltage Vout, which may be used for powering a load. The voltage converter may include a boost converter, a buck converter, or a boost-buck converter, and may be for example the voltage converter described in conjunction with FIG. 2. The mode control method 700 may be further applied to a voltage converter which converts alternating current to direct current.

As an example, the voltage converter to which the mode control method 700 is applied may include: a voltage conversion circuit including a control device and an inductor, the inductor being capable of performing charging and discharging operations, the control device being for operating under driving of a drive signal to control the charging and discharging operations of the inductor; and a logic drive unit for adjusting an operation mode of the voltage conversion circuit, and generating the drive signal for driving the control device, so as to obtain a desired output voltage.

As shown in FIG. 7, the mode control method 700 may include: detecting inductance current flowing on an inductor in the voltage conversion circuit, and outputting at least one of a peak value IL_peak and a valley value IL_valley of the detected inductance current IL (S710); when the voltage converter operates in the continuous control mode, determining whether to switch from a continuous control mode to a discontinuous control mode can be based on a peak-to-peak value of the inductance current and the valley value IL_valley of the detected inductance current (S720); when the voltage converter operates in the discontinuous control mode, determining whether to switch from the discontinuous control mode to the continuous control mode can be based on the peak value IL_peak or the valley value IL_valley of the detected inductance current IL (S730). Hereinafter, a case that the continuous operation mode is a PWM mode and the discontinuous operation mode is a PFM mode is taken as an example to describe the operation of the mode control method 700.

The current flowing on the inductor (e.g., the inductor 203 in FIG. 2) in the voltage conversion circuit is detected in S710. As an example, the current at the point SW in the voltage conversion circuit in FIG. 2 may be detected. The peak value and the valley value on the inductor can be determined based on the inductance current, and switching of the control mode is determined by the peak value and the valley value.

Various techniques may be adopted to detect the inductance current flowing on the inductor. For example, a resistor with an extremely small resistance may be used to separate a small part of current signals from the inductor. Or, a linear resistance area of a power tube (e.g., MOSFET) may be used to detect the inductance current, and accordingly the inductance signal may be detected by detecting a voltage between a source and a drain of the power tube when it operates in the linear resistance area. The techniques for detecting the inductance signal as adopted do not constitute a limitation to the embodiments of present application. Alternatively, in S710, the voltage at the point SW in the voltage conversion circuit in FIG. 2 may further be detected, so as to obtain the inductance voltage, and the peak value or valley value of the detected inductance voltage is outputted.

As described above in conjunction with FIG. 4, when it is necessary to detect the peak value of the inductance current, the inductance current during the charging process of the inductor may be detected. As an example, when the triode 201 turns on and the triode 202 turns off in FIG. 2, the voltage Vsw at the point SW can be detected, and the inductance current can be obtained by the above Equation (1).

When it is necessary to detect the valley value of the inductance current, a valley value reached during the discharging process of the inductor may be detected. As an example, when the triode 201 turns off and the triode 202 turns on to discharge the inductor, the voltage Vsw at the point SW in FIG. 2 may be detected, the inductance current can be obtained by the above Equation (2), and the valley value IL_valley of the inductance current can be obtained based on the inductance current IL.

The above merely schematically illustrate a mode to detect the peak value and the valley value of the inductance current in S710. Alternatively, the current on the connection point between the inductor and the load may be further detected to obtain the peak value and the valley value of the inductance current.

In S720, when the voltage converter operates in a continuous control mode, whether to switch from the continuous control mode to the discontinuous control mode is determined based on a peak-to-peak value ΔIL of the inductance current and the valley value IL_valley of the inductance current detected in S710. As an example, whether to switch the continuous control mode to the discontinuous control mode may be determined based on the above Equation (3). When the load current and the inductance current of the voltage converter satisfy the above Equation (3), the continuous control mode is switched to the discontinuous control mode. When the load current and the inductance current of the voltage converter do not satisfy the above Equation (3), the current continuous control mode is maintained. As described above in conjunction with Equation (4), when the voltage converter operates in a PWM mode, the peak-to-peak value ΔIL of the inductance current may be pre-calculated based on the Equation (4).

As shown in FIG. 4, when the voltage converter operates in the PWM mode, if the load powered by the voltage converter gradually decreases, the load current ILoad also gradually decreases. When the load current ILoad is less than or equal to a difference between a half of the peak-to-peak value ΔIL and an absolute value of the valley value IL_valley (the switching point 1 in FIG. 4), the voltage converter is switched from the PWM mode to a PFM mode; otherwise, the voltage converter is maintain in the PWM mode and continuously performs the charging and discharging operations.

Compared with switching from the PWM mode to the PFM mode when the load current ILoad decreases to be less than or equal to ΔIL/2 in the prior art, the present invention can switch from the PWM mode to the PFM mode when the load current ILoad decreases to be ΔIL/2−|IL_valley|. The absolute value of the valley value of the inductance current is a lagging component added relative to the prior art, which can reduce impact of noise on switching of the voltage converter, so as to reduce the ripple of the output voltage of the voltage converter.

Alternatively, in S720 it may not be necessary to obtain the load current Iload, but merely determine whether to switch from the continuous control mode to the discontinuous control mode based on the valley value IL_valley of the detected inductance current. In the continuous control mode of the voltage converter, when the load current decreases, the valley value of the inductance current also decreases; when the load current increases, the valley value of the inductance current also increases. A monotonous correspondence exists between the two as shown by Equation (5). It can be seen by substituting Equation (5) into the above Equation (3) that, whether to switch from the continuous control mode to the discontinuous control mode can be determined merely based on the valley value IL_valley of the inductance current. Correspondingly, a valley threshold of the inductance current may be preset. When the valley value of the detected inductance current is less than or equal to the valley threshold, the continuous control mode is switched to the discontinuous control mode. When the valley value of the detected inductance current is greater than the valley threshold, the current continuous control mode is maintained.

When a user of the voltage converter expects to set different minimum ILoad_min of load current with respect to different applications, that is, the minimum ILoad_min of the load current is predetermined for a specific application, whether to switch from the continuous control mode to the discontinuous control mode may be determined based on the valley value of the detected inductance current according to the above Equation (6). If different minimum ILoad_min of the load current are set for different applications, the valley threshold of the inductance current can be easily obtained according to Equation (6), so as to facilitate flexible control of switching from the continuous control mode to the discontinuous control mode by setting the valley threshold in different applications.

In S730, when the voltage converter operates in the discontinuous control mode, whether to switch from the discontinuous control mode to the continuous control mode is determined based on the peak value IL_peak or the valley value IL_valley of the detected inductance current IL. As an example, the load current may be obtained, and whether to switch from the discontinuous control mode to the continuous control mode may be determined based on the above Equation (7). When the detected load current ILoad satisfies Equation (7), it is determined to switch from the discontinuous control mode to the continuous control mode; when the detected load current ILoad does not satisfy Equation (7), it is determined to maintain the current discontinuous control mode.

When the load current decreases, the peak value of the inductance current also decreases. When the load current increases, the peak value of the inductance current also increases. When the load of the voltage converter increases so that it is necessary to increase the load current, if the load current increases to satisfy Equation (7), the electric energy conversion capability represented by the inductance current in the discontinuous control mode may no longer meet the requirement of load. It is necessary to quit the discontinuous control mode, and switch to the continuous control mode to provide stronger electric energy conversion capability to meet the requirement of the load current.

Optionally, the inductance current may be limited to be less than or equal to the peak threshold IL_peak_th and greater than or equal to the valley threshold IL_valley_th, and whether to switch from the discontinuous control mode to the continuous control mode is determined based on the peak value IL_peak or the valley value IL_valley of detected the inductance current, which will be described in conjunction with a case that the discontinuous control mode is the PFM mode. As an example, the mode control method 700 may typically further include: when the voltage converter operates in the discontinuous control mode, limiting the inductance current of the inductor to be less than or equal to the peak threshold IL_peak_th and greater than or equal to the valley threshold IL_valley_th based on the detected inductance current (S731).

In S731, the inductance current may be limited between the peak threshold IL_peak_th and valley threshold IL_valley_th by controlling the triodes 201 and 202 in FIG. 2 to turn on and off. As an example, the peak threshold IL_peak_th of the inductance current in the PFM mode may be determined according to the above Equation (8). The valley threshold IL_valley_th may be a preset value and less than the peak threshold IL_peak_th, which may be equal to 0, or be greater than 0 or less than 0.

When the voltage converter is operating in the PFM mode, and the inductance current is limited between the peak threshold IL_peak_th and the valley threshold IL_valley_th, in S730, the load current may be obtained, the obtained load current is compared with the peak threshold IL_peak_th, and whether to switch from the PFM mode to the PWM mode is determined according to the above Equation (7). Alternatively, in S730, whether to switch from the PFM mode to the PWM mode may be further determined based on the valley value IL_valley of the detected inductance current. When the valley value IL_valley of the detected inductance current is equal to the valley threshold IL_valley_th, it is determined to maintain the current PFM mode; when the valley value IL_valley of the inductance current detected by the inductance signal detection unit 241 is greater than the valley threshold IL_valley_th, it is determined to switch from the PFM mode to the PWM mode.

When the peak value of the inductance current of the voltage converter is limited in the discontinuous control mode, a switching point from the discontinuous control mode to the continuous control mode may be lowered by reducing the peak threshold of the inductance current. In addition, in a case that the load of the voltage converter is very light, reducing the peak threshold of the inductance current may further reduce the turn-on time of the inductor in the voltage converter, in order to improve operation efficiency of the voltage converter. It should be noted that the user can change the peak threshold IL_peak_th and the valley threshold IL_valley_th of the inductance current in the discontinuous control mode as required in different applications.

In the present application, there is a lagging component between the switching thresholds of the continuous control mode and the discontinuous control mode, and the lagging can reduce impact of the noise on switching of the voltage converter, so as to reduce the ripple of the output voltage when the voltage converter is in a light load state.

When the voltage converter performs mode control, in addition to that the mode control method 700 includes both step S720 and step S730, the mode control method 700 can also include one of step S720 and step S730. That is, the mode control method 700 may only include step S710 and step S720, so as to control the voltage converter to switch from the continuous control mode to the discontinuous control mode. Or, the mode control method 700 may only include step S710 and step S730, so as to control the voltage converter to switch from the discontinuous control mode to the continuous control mode.

In the various examples described herein, references are made to triodes. It will be understood that such triodes can include transistors such as field-effect transistors (FETs). Such FETs can include, for example, MOSFET devices and/or transistors implemented in other process technologies. Other types of transistors can be utilized to implement one or more features of the present disclosure.

Those skilled in the art can understand, for convenience and simplicity of the description, the specific implementations of the method embodiments described above can be referred to corresponding process in the preceding product embodiments.

Those with ordinary skill in the art can appreciate that, devices and algorithm steps described with reference to the embodiments disclosed in this application may be implemented through electronic hardware, or a combination of the electronic hardware and software. As for each specific application, a person skilled in the art can use different methods to implement the described functions, but such implementations should not be construed as being beyond the scope of the present invention.

Principles and advantages of technical solutions described above are applicable to any voltage converter. The voltage converter can be applied in a variety of electronic apparatuses, which may include, but not are limited to, an electronic product, a portion of an electronic product, electronic test equipment etc. The consumer electronic product may include, but is not limited to, a smart phone, a TV, a tablet computer, a monitor, a personal digital assistant, a camera, an audio player, a memory etc. A portion of the consumer electronic product may include a multi-chip module, a power amplifier module etc.

The above described are only specific implementations of the present technical solution, but the scope of the present technical solution is not limited thereto, and any alternatives and equivalents that can be conceivable by a person skilled in the art should be encompassed within the scope of protection of the present technical solution.

What is claimed is:

1. A voltage converter comprising:
   a voltage conversion circuit including an inductor configured to be charged and discharged to facilitate conversion of a first voltage to a second voltage, and a switch configured to allow the inductor to be charged and discharged;
   a drive unit configured to provide a drive signal to the switch to control the charging and discharging of the inductor; and
   a mode control unit configured to provide a mode-switching signal to the drive unit to control switching from a continuous control mode to a discontinuous control mode based on a first threshold level associated with an inductance current, and from the discontinuous control mode to the continuous control mode based on a second threshold level associated with the inductance current.

2. The voltage converter of claim 1 wherein the mode control unit is configured to provide the mode-switching signal to the drive unit based on the inductance current associated with the inductor.

3. The voltage converter of claim 1 wherein the continuous control mode includes a pulse width modulation (PWM) mode, and the discontinuous control mode includes a pulse frequency modulation (PFM) mode.

4. The voltage converter of claim 1 wherein the mode control unit includes an inductance signal detection unit configured to detect the inductance current and output at least one of a peak value IL_peak and a valley value IL_valley of the detected inductance current.

5. The voltage converter of claim 4 wherein the mode control unit further includes a first switching determination unit and a second switching determination unit.

6. The voltage converter of claim 5 wherein the first switching determination unit is configured to determine whether to switch from the continuous control mode to the discontinuous control mode based on a peak-to-peak value $\Delta$IL of the inductance current and the valley value IL_valley of the inductance current detected by the inductance signal detection unit.

7. The voltage converter of claim 6 wherein the first threshold value has a value of $(\Delta IL/2)-|IL\_valley|$, such that the first switching determination unit determines whether to switch from the continuous control mode to the discontinuous control mode when a load current ILoad on a load powered by the voltage converter is less than or equal to the first threshold value.

8. The voltage converter of claim 7 wherein the quantity |IL_valley| is a lagging component capable of reducing impact of noise on switching of the voltage converter to avoid frequent mode switching in the voltage converter.

9. The voltage converter of claim 6 wherein the first threshold value has a selected value of the valley value IL_valley of the inductance current.

10. The voltage converter of claim 9 wherein a load current ILoad on a load powered by the voltage converter has a monotonic functional relationship with the valley value IL_valley of the inductance current.

11. The voltage converter of claim 10 wherein the load current ILoad includes a selectable minimum ILoad_min to satisfy a relationship $|IL\_valley|\leq(\Delta IL/2)-ILoad\_min$, such that when the valley value IL_valley detected when the inductance current is less than zero satisfies the relationship, the continuous control mode is switched to the discontinuous control mode, and when the valley value IL_valley detected when the inductance current is less than zero does not satisfy the relationship, the continuous control mode is maintained.

12. The voltage converter of claim 11 wherein the minimum value ILoad_min of the load current being selectable with respect to different applications allows the valley threshold of the inductance current to be easily obtained according to the relationship to facilitate flexible control the switching from the continuous control mode to the discontinuous control mode.

13. The voltage converter of claim 6 wherein the second switching determination unit is configured to determine whether to switch from the discontinuous control mode to the continuous control mode based on at least one of the peak value or the valley value of the inductance current detected by the inductance signal detection unit.

14. The voltage converter of claim 13 wherein the second threshold value has a value of a IL_peak, such that the second switching determination unit determines whether to switch from the discontinuous control mode to the continuous control mode when a load current ILoad on a load powered by the voltage converter is greater than the second threshold value, the quantity a being a constant greater than or equal to ½ and less than 1.

15. The voltage converter of claim 14 wherein the second switching determination unit is further configured to obtain the inductance current less than or equal to a peak threshold IL_peak_th and greater than or equal to a valley threshold IL_valley_th and determine whether to switch from the discontinuous control mode to the continuous control mode based on the peak value IL_peak and the valley value IL_valley of the inductance current.

16. The voltage converter of claim 15 wherein the second switching determination unit includes a limiting component configured to limit the inductance current of the inductor to be less than or equal to the peak threshold IL_peak_th and greater than or equal to the valley threshold IL_valley_th based on the inductance current.

17. The voltage converter of claim 16 wherein the limiting component is configured to determine the peak threshold IL_peak_th of the inductance current in a pulse frequency modulation mode according to a relationship IL_peak_th=ILoad_min/a, the quantity a being a constant greater than or equal to ½ and less than 1.

18. The voltage converter of claim 16 wherein the second switching determination unit further includes a switching determination component configured to determine whether to switch from the discontinuous control mode to the continuous control mode based on the peak value IL_peak or the valley value IL_valley of the detected inductance current.

19. A method for operating a voltage converter, the method comprising:
  performing switching operations to charge and discharge an inductor to facilitate conversion of a first voltage to a second voltage;
  providing a drive signal to facilitate the switching operations; and
  generating a first mode-switching signal to control switching from a continuous control mode to a discontinuous control mode based on a first threshold level associated with an inductance current, and a second mode-switching signal to control switching from the discontinuous control mode to the continuous control mode based on a second threshold level associated with the inductance current.

20. An electronic apparatus comprising:
  a power management system configured to provide a supply voltage;
  a module configured to provide one or more functionalities for the electronic apparatus, the module further configured to utilize a regulated voltage based on the supply voltage; and
  a voltage converter configured to receive the supply voltage and generate the regulated voltage, the voltage converter including a voltage conversion circuit having an inductor configured to be charged and discharged to facilitate conversion of an input voltage to an output voltage, and a switch configured to allow the inductor to be charged and discharged, the voltage converter further including a drive unit configured to provide a drive signal to the switch to control the charging and discharging of the inductor, the voltage converter further including a mode control unit configured to provide a mode-switching signal to the drive unit to control switching from a continuous control mode to a discontinuous control mode based on a first threshold level associated with an inductance current, and from the discontinuous control mode to the continuous control mode based on a second threshold level associated with the inductance current.

* * * * *